United States Patent Office 3,840,439
Patented Oct. 8, 1974

3,840,439
METHOD FOR MEASURING LONG CELL CORROSION RATES
Glenn A. Marsh, Fullerton, Calif., assignor to Union Oil Company of California, Los Angeles, Calif.
Continuation-in-part of abandoned application Ser. No. 803,596, Mar. 3, 1969, which is a continuation-in-part of application Ser. No. 457,453, May 20, 1965, now Patent No. 3,436,320, which is a continuation-in-part of application Ser. No. 322,281, Nov. 8, 1963, now Patent No. 3,398,065, which in turn is a continuation-in-part of abandoned application Ser. No. 248,451, Dec. 31, 1962. This application Apr. 12, 1972, Ser. No. 243,479
Int. Cl. G01n 27/00
U.S. Cl. 204—1 T                    14 Claims

ABSTRACT OF THE DISCLOSURE

A method for measuring instantaneous long cell (pitting) corrosion rates. A D.C. potential of less than 0.03 volts is applied across two spaced electrodes which are fabricated of the metal to be tested and exposed to a corrosive electrolytic environment, and the magnitude and direction of current flowing between the electrodes is measured. The polarity of the potential is reversed and the magnitude and direction of current flow again measured. Long cell or pitting corrosion rate is proportional to the vectorial average of the current readings obtained with potentials of opposite polarity impressed across the electrodes.

---

Figure 1:
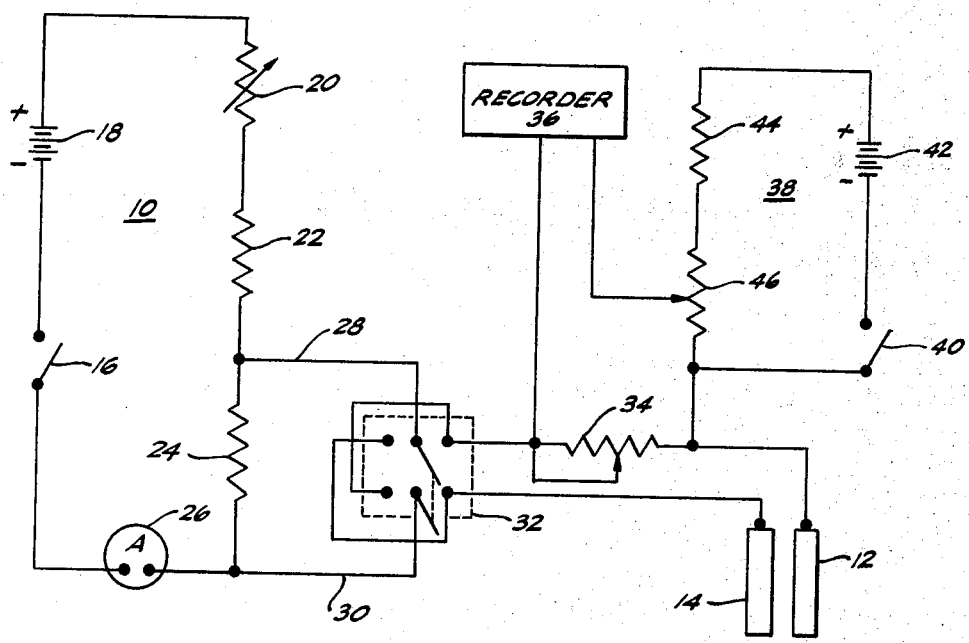

This application is a continuation-in-part of application Ser. No. 803,596, filed Mar. 3, 1969, now abandoned, which is a continuation-in-part of application Ser. No. 457,453, filed May 20, 1965, now issued as U.S. Pat. 3,436,320, which in turn is a continuation-in-part of application Ser. No. 322,281, filed Nov. 8, 1963, now issued as U.S. Pat. 3,398,065, which in turn is a continuation-in-part of application Ser. No. 248,451, filed Dec. 31, 1962, now abandoned.

This invention relates to the determination of long cell corrosion rates of metallic surfaces exposed to a corrosive electrolytic environment.

The corrosion of a metallic surface exposed to a neutral aqueous solution is influenced by the availability of dissolved oxygen and by the conductivity of the electrolyte. Most metals, such as steel, corrode in an aqueous oxygen-containing electrolyte by local cell action, long cell action, or by a combination of both local and long cell action. In local cell action, available dissolved oxygen is reduced at microscopic cathodic sites and the metal is oxidized at adjacent microscopic anodic sites. In long cell action, available dissolved oxygen is reduced at the cathodic sites and the metal is oxidized at adjacent anodic sites. In long cell action, the cathodic and anodic sites, or zones, are separated by macroscopic distances. The driving force for the long cell action is generally derived from the difference in the availability of oxygen between the two zones, and is relatively independent of the means by which this difference is achieved. Long cell action becomes increasingly likely as the conductivity of the electrolytic increases, the maximum distance between the cathodic and anodic sites being as much as 100 feet or more in high conductivity environments.

Long cell activity is important in determining metal life since it can be directly correlated to the pitting tendencies of the metallic surface. Hence, as the long cell activity increases, the pitting corrosion increases. Pitting corrosion, as a result of long cell action, normally occurs when components of low permeability (e.g., a sand grain, etc.) contact metallic surfaces in an environment which is sufficiently conductive and aerated. For example, if iron is the corrodible surface, ferrous ions formed under an attached low permeability component are eventually converted to hydrous ferric oxide. The formation of hydrous ferric oxide, in turn, acts as an adhesive, cementing the said component to the surface of the metal, and at the same time further restricting the access of oxygen. The anodic area, under the low permeability component, develops more intensely with time as the cementing process continues, and as the anodic area develops the pitting corrosion rate increases. In addition, there is a gradual buildup of hydrogen ions in the growing pits which further accelerates the corrosion process. Thus, in order to determine a meaningful corrosion rate of a metallic surface both the local cell and long cell corrosion must be taken into account.

It is a primary object of this invention to provide a novel method for measuring instantaneous long cell corrosion rates.

It is another object of this invention to provide a method for determining the immediate effect of corrosion inhibitors on long cell corrosion rates.

It is a further object of this invention to provide a method for determining the long cell corrosion current of a corroding system.

Other and related objects will become apparent from the following description of the invention.

In accordance with this invention, the local cell and long cell corrosion activity of a metal are determined. Electrodes fabricated of the metal for which the corrosion rates are to be determined are disposed in a corrosive environment, and a D.C. potential having a value of less than about 0.03 volt, preferably between about 0.001 and 0.025 volt and more preferably between about 0.01 and 0.025 volt, is applied between the electrodes. This potential is preferably less than 0.03 volt since non-linearity of the measured $\Delta I/\Delta E$ function, with corrosion rate, may result if the applied potential is too high. The $\Delta E$ is the potential applied across the corroding electrodes, and $\Delta I$ is the current flow between the electrodes during the experimental run. The magnitude and direction of the current flow which takes place during the time the D.C. potential is applied is measured. A second D.C. potential of the same magnitude and opposite polarity from that of the first applied potential, is then applied between the electrodes and the magnitude and direction of the resulting current flow measured. The relative long cell corrosion rate of the metal is determined from the vectorial average of the measured current flow, i.e., the degree of displacement of the vectorial average current flow from zero, and the local cell corrosion rate is determined from the absolute difference between the measured current flow and the vectorial average current flow.

Figure 2:
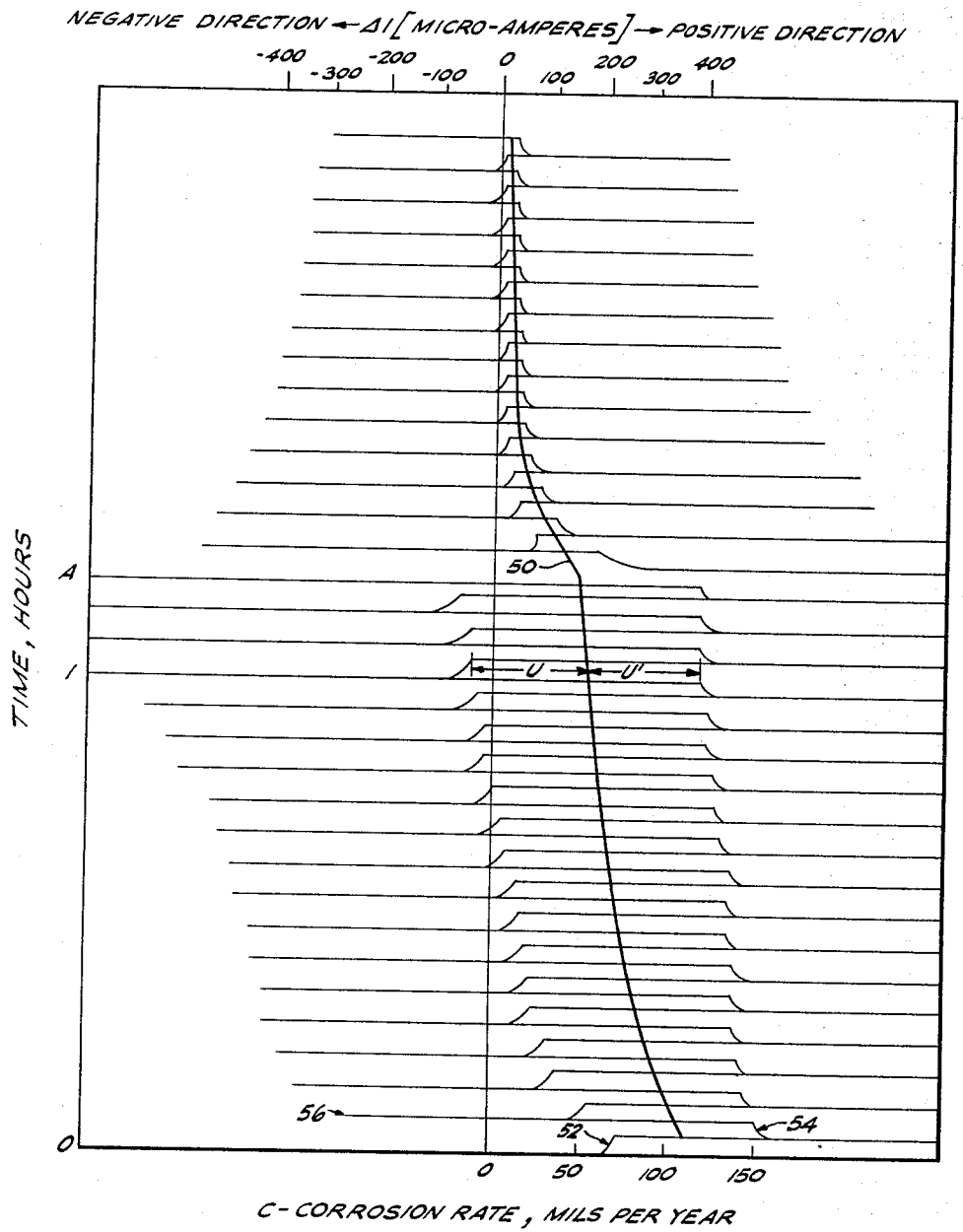

The invention will be explained with reference to the drawings, in which:

FIG. 1 is a schematic diagram of an electrical circuit adapted to measure and record long cell corrosion current; and FIG. 2 is an example of the data obtained by the apparatus of FIG. 1.

The "polarization resistance" method was utilized in the development of this invention. It has been reported [E. J. Simmons, Corrosion 11, 255t (1955) and R. V. Skold and T. E. Larson, Corrosion 13, 39t (1957)] that when a small current is passed through a metallic coupon immersed in a corrodent and the change in electrode potential $\Delta E$ upon passage of external current $\Delta I$ is noted, the ratio $\Delta E/\Delta I$, designated as the "polarization resistance," is apparently inversely proportional to the instantaneous corrosion rate of the coupon. It was later shown [M. Stern, Corrosion 14, 440t (1958)] that there is a theoretical basis for the above empirical relationship. Assuming that the polarization curves for the local anodes and cathodes are logarithmic, i.e., the change of potential is linear with a logarithmic change of the current, this theoretical relationship can be expressed as follows:

$$\frac{\Delta E}{\Delta I} = \frac{B_a B_c}{(2.3)(I_{corr.})(B_a + B_c)} \quad (1)$$

where $B_a$ and $B_c$ are the slopes of the local anodic and cathodic polarization curves, respectively, and $I_{corr.}$ is the corrosion current.

Equation 1, however, applies to the region where $\Delta I$ is very small, and where the corrosion rate is controlled by activation polarization. In situations where diffusion of dissolved oxygen controls the corrosion rate, $B_c$ is practically infinite, since an increase in applied potential in the cathodic direction cannot result in an increase in local cathodic current density. For such a case, Equation 1 becomes:

$$\frac{\Delta E}{\Delta I} = \frac{B_a}{(2.3)(I_{corr.})} \quad (2)$$

For various metals and alloys, $B_a$ has a value from about 0.07 to 0.15 volt.

Apparently, any metal or alloy may be used in the "polarization resistance" method. Even if Equation 1 does not hold strictly for the metal in question, i.e., if the polarization is not a logarithmic function of current or if the values of $B_a$ and $B_c$ change during the course of an experiment, there will still be a qualitative relationship in which a higher $\Delta I$ represents a higher corrosion rate. This is inherent in the concept of electrochemical polarization.

The principal objections to the "polarization resistance" method of obtaining corrosion rates are that a reference electrode is required and that precise electrode potential data are necessary. Both of these objections are overcome however, by utilizing two electrodes of the same metal or alloy in the "dual electrode" method.

In the "dual electrode" method two substantially identical electrodes are used, and the instantaneous corrosion rate is approximated by measuring the current necessary to effect a difference of less than about 0.03 volt in the potential of the electrodes. It will be noted that the potential is measured between the two electrodes rather than by comparison to a reference electrode. Current passing between the electrodes depresses the potential of one of them and elevates the potential of the other from the freely corroding potential. An averaging system is desirable since the electrode potentials of two substantially identical pieces of metal may be different when the electrodes are immersed in the same electrolyte. Current is first passed through the electrodes in one direction and the $\Delta I$ required to develop a potential of less than about 0.03 volt is recorded. Then the current is reversed and the new $\Delta I$ is noted.

In order to accurately convert corrosion current to common units of corrosion rate, a calibration is needed in which the corrosion rates are measured by another means at the same time as $\Delta I$ measurements are being made. Also, since the measured potential difference, which is preferably about 0.02 volt, is equal to the sum of the desired polarization changes at the anodic and cathodic surfaces, plus the unwanted IR drops at these surfaces and through the electrolyte, a correction must be made for these IR drops. This calibration is fully disclosed in U.S. Pat. No. 3,398,065, and such patent is incorporated herein by reference.

The calibration is based on Equations 1 and 2, which for the dual electrode modification is:

$$I_{corr.} = \frac{2B\Delta I}{2.3E} \quad (3)$$

where B is a constant, such as $B_a B_c / B_a + B_c$. It is also convenient to hold $\Delta E$ constant. The quantity $I_{corr.}$ is the current density, and can be expressed as a measure of the relative corrosion rate. If desired, the current density can be converted to common units of corrosion rate by the application of Faraday's Law. For example, a typical conversion factor for steel is $2.2 \times 10^{-6}$ ampere/cm.$^2$/mil per year. Substituting this factor into Equation 3 results in the following:

$$C = \frac{2B\Delta I}{2.3(\Delta E)(2.2\ \mu a./cm.^2)A} \quad (4)$$

where C is the corrosion rate in mils per year, $\Delta I$ is the measured current in microamperes ($\mu a.$), $\Delta E$ is the applied electrode voltage in volts, and A is the electrode area in CM.$^2$.

Equation 4, for determining the corrosion rate, may be simplified as:

$$C = K' \frac{\Delta I}{\Delta E} \quad (5)$$

where K' is a constant "calibration factor" for a specific system since it includes the value of B of the metal from which the electrodes are fabricated and the electrode area. However, since $\Delta E$ is preferably held constant at 0.02 volt, K' can also include this electrode voltage ($\Delta E$) of 0.02 volt. Equation 5 can then be simplified to:

$$C = KI \quad (6)$$

Apparatus which can be employed in the method of this invention is schematically illustrated in FIG. 1. The numeral 10 represents an electrical circuit adapted to apply a potential of less than about 0.03 volt between electrodes 12 and 14. Circuit 10 consists of switch 16, D.C. potential source 18, variable resistor 20, resistor 22, resistor 24 and an ammeter 26 capable of reading fractional amperes, such as 0–100 microammeters, all series connected in closed circuit. An obvious example of the D.C. potential source 18 is a dry cell battery. Variable resistor 20 is included in circuit 10 so that the resistance thereof can be adjusted to provide a constant potential across the electrodes. Ammeter 26 indicates the current flowing through circuit 10 so that the potential applied to electrodes 12 and 14 can be determined by Ohm's law. As the description of this embodiment proceeds, it will be apparent that circuit 10 represents only one example of a circuit which can be used to apply the desired constant D.C. potential across electrodes 12 and 14.

Circuit 10 is connected to electrodes 12 and 14 through conductors 28 and 30, which are connected respectively to circuit 10 at the junction of resistors 22 and 24 and at the junction of resistor 24 and ammeter 26. Conductors 28 and 30 pass through time-operated relay 32, which is set to automatically reverse the polarity of the potential applied between electrodes 12 and 14 by circuit 10 at suitable intervals of time such as about 0.5 to 30 minutes, however, shorter or longer time intervals may be employed. Alternatively, relay 32 may be a manually operated reversing switch.

Conductor 28 includes variable resistor 34 connected in series between relay 32 and electrode 12. Recorder 36, such as a 0–10 millivolt recorder, is connected across resistor 34 to record the IR drop across the resistor. Variable resistor 34, which is preferably 2 1–100 ohm helical potentiometers, serves as a sensitivity adjustment for recorder 36. Biasing circuit 38 permits recorder 36 to operate as a center-zero recorder. Circuit 38 includes switch 40, D.C. potential source 42, resistor 44 and potentiometer 46, all series connected in closed circuit.

The potential $E_1$, applied to recorder 36 from the IR drop across variable resistor 34 and from biasing circuit 38, is represented by:

$$E_1 = \frac{\Delta V R_{34} \Delta I}{\Delta V + R_{34} \Delta I} \quad (7)$$

where $R_{34}$ is the adjusted resistance of variable resistor 34, and $\Delta V$ is the bias voltage applied from circuit 38 on recorder 36, and where $\Delta V$ is held substantially constant at less than 0.03 volt. Since the adjusted resistance across variable resistor 34 is constant during operation, recorder 36 can be calibrated directly in terms of $\Delta I$. Hence, recorder 36 can indirectly measure the current flow between electrodes 12 and 14. Recorder 36 can be further calibrated to read directly in terms of corrosion rate, since corrosion rate as shown by Equation 6 is a direct function of $\Delta I$.

Various modifications of the circuit illustrated in FIG. 1 will be obvious to those skilled in the art. As hereinbefore pointed out, circuit 10 represents only one example of a circuit which can be used to apply a voltage of not more than about 0.03 volt across electrodes 12 and 14. Recorder 36 and circuit 38 may be replaced with a vacuum tube voltmeter where it is not necessary or desirable to utilize a recorder. On the other hand, circuit 38 can be omitted, or the components thereof can be changed depending upon the specific recorder utilized. Relay 32 is preferably located as indicated in FIG. 1 since in this position it affects a desirable recorder pattern, where the recorder center represents zero current. Alternatively, the relay 32 can be relocated intermediate variable resistor 34 and electrodes 12 and 14.

In the practice of the method of this invention with the apparatus illustrated in FIG. 1, switches 12 and 40 are closed and variable resistor 20 is adjusted so that circuit 10 applies a constant voltage of less than about 0.03 volt, preferably 0.02 volt, across conductors 28 and 30. Variable resistor 34 is adjusted so that the IR drop across it is on the scale of the recorder, and variable resistor 46 is adjusted so that the zero position of the recorder is substantially in the center of the scale thereof. The system is then in automatic operation with relay 32 causing the polarity of the potential applied between electrodes 12 and 14 to be reversed at predetermined intervals, generally between about 0.5 and 30 minutes, preferably between about 0.5 and 10 minutes, and more preferably between about 1 and 5 minutes, and with recorder 36 recording the IR drop across variable resistor 34. Since the adjusted resistance across the variable resistor 34 is constant during operation, the voltage registered by recorder 36 can be read directly in terms of current.

The current flow measurements obtained by the foregoing technique can be readily converted into long cell and local cell corrosion currents or corrosion rates. The long cell corrosion current is obtained by vectorially averaging the current flow between the test electrodes upon the application of a D.C. potential of less than 0.03 volts and the current flow between the electrodes upon reversal of the polarity of the D.C. potential. The long cell corrosion rate is obtained by multiplying the long cell corrosion current by K, which is defined in Equation 6. The local cell corrosion current, on the other hand, is obtained by determining the absolute difference between the observed current flow and the vectorial average current flow. Thus, the long cell corrosion current is the vectorial average current flow, i.e., the displacement of the average current flow from zero, and the local cell corrosion current is the absolute value of the difference between the current flow between the electrodes upon the application of a D.C. potential of less than 0.03 volt and the vectorial average current obtained from such measurement, i.e., the "spread" of the observed current from the vectorial average value. The local cell corrosion rate is found by multiplying the local cell corrosion current by K, which is defined in Equation 6. In determining the corrosion currents it is necessary that both the magnitude and direction of the observed current flow between the electrodes be taken into account, since the currents measured may flow in opposite directions upon reversal of the potential polarity. If the current flow measurements are treated as vector quantities in determining the corrosion currents, then the following equations can be made to relate the current flow measurements to the long cell corrosion currents;

$$I_{\text{Long Cell}} = \frac{\left| \sum_{0}^{n_1} \Delta I_n + \sum_{0}^{n_2} \Delta I_n' \right|}{n_1 + n_2} \quad (8)$$

where $\Delta I_n$ is the current flow vector measured between electrodes upon the application of a D.C. potential of less than 0.03 volt;

$\Delta I_n'$ is the current flow vector measured between the electrode upon the application of a D.C. potential of the same magnitude of less than 0.03 volt and of opposite polarity than that potential applied to obtain $\Delta I_n$;

$n_1$ is the total number of $\Delta I_n$ current flow measurements; and $n_2$ is the total number of $\Delta I_n'$ current flow measurements;

and where $n_1 = n_2$ $$I_{\text{Local Cell}} = \frac{\left| \sum_{0}^{n_1} \Delta I_n - \sum_{0}^{n_2} \Delta I_n' \right|}{n_1 + n_2} \quad (9)$$

where $n_1 = n_2$.

The long cell and local cell corrosion currents can be obtained from Equations 8 and 9 with as few as two current flow measurements ($n_1 = n_2 = 1$), however, it is recommended that more experimental measurements be utilized in calculating the corrosion currents to reduce the probability and degree of error.

The following example is presented to more precisely describe this invention.

The apparatus employed in this example is schematically illustrated in FIG. 1. Circuit 10, shown in FIG. 1, consists of on-off toggle switch 16, D.C. potential source 18 of 1.5 volts, variable resistor 20 of 0–10 ohms, resistor 22 of 40 ohms, resistor 24 of 0.4 ohm, and ammeter 26 having a range of 0–100 microamperes, all series connected in closed circuit. Circuit 10 is connected to electrodes 12 and 14 through conductors 28 and 30 which are connected respectively to circuit 10 at the junction of resistors 22 and 24, and at the end of resistor 24 remote from resistor 22. Conductors 28 and 30 pass through relay 32 which is set to automatically reverse the polarity of the potential applied to electrodes 12 and 14 every two minutes. Conductor 28 includes 0–100 ohm potentiometer 34 which is between electrode 12 and relay 32. Ten millivolt recorder 36 is connected across the potentiometer 34 to read the IR drop across the potentiometer. The zero adjustment of recorder 36 is accomplished by means of biasing circuit 38. Circuit 38 includes, on-off toggle switch 40, D.C. potential source 42 of 1.5 volts, resistor 44 of 150 kilohms, and potentiometer 46 of 0–1 kilohm, all series connected in closed circuit.

After the apparatus has been assembled as depicted in FIG. 1, it must be calibrated. To calibrate the aforementioned apparatus, switches 16 and 40 are closed and voltmeter is connected to conductors 28 and 30 in the place of electrodes 12 and 14. Variable resistor 20 is adjusted so that circuit 10 applies a potential of about 0.02 volt to the voltmeter. The potentiometer 46 is then adjusted to center recorder 36. The test electrodes, being two mild steel bars each having a diameter of 0.5 cm. and exposed area of 5 cm.$^2$, are disposed in a 3 percent aqueous sodium chloride solution. Conductors 28 and 30 are connected to the electrodes 12 and 14, and variable resistor 34 is adjusted to give a measurable deflection on recorder 36. Variable resistor 20 is readjusted to apply a D.C. potential of about 0.02 volts across electrodes 12 and 14. It is recommended that the aforementioned apparatus be allowed to warm up for a short period, generally, between about 5 and 60 minutes, before taking current flow measurements. It is also desirable to periodically recalibrate the apparatus to compensate for any potential drifting of circuits 10 and 38.

Corrosion data are obtained by activating relay switch 32 and recorder 36. An example of the record produced by recorder 36 is illustrated in FIG. 2. The negative and positive values assigned to the currents presented therein merely indicate the direction of current flow and are relative to the direction of deflection of the recorder pen for any applied potential. After 1 hour and 12 minutes, designated at time A in FIG. 2, 1 percent sodium nitrite, based on the weight of the sodium chloride solution, is added to the solution to demonstrate the inhibiting effect of the nitrite.

The points on the graph where the record rises indicate the current flow between the electrodes having a value corresponding to the distance the points are from the center of the graph. Upon the application of a D.C. potential across the electrodes, the initial current flow between the electrodes attains a peak value as indicated by point 56 in FIG. 2. The current flow, however, quickly drops from this peak value and stabilizes at some intermediate value as indicated by the horizontally displaced rises 52 and 54. The vectorial average current flow between the electrodes is determined by vectorially averaging the distance two sequentially-recorded horizontally-displaced rises are from the center-point of the graph. The displacement of the average current, designated by line 50, from center zero, i.e., the vectorial average current flow represents the "long cell" corrosion current. The long cell corrosion current was deliberately emphasized by employing a clean electrode and a rusted electrode. The distance between line 50 and the edge of the curve (designated by U and U') represents the "local cell" corrosion current, i.e., the average corrosion current of the electrodes in the environment independent of the effect of the dissimilarity between the electrodes. Since line 50 is the midpoint between the edges of the curve U and U', the "local cell" corrosion current is obtained by measuring the distance from line 50 to the horizontally displaced rises 52 and 54. The local cell corrosion rate is obtained by comparing that distance with C in mils per year (lower scale) in FIG. 2.

The long cell and local cell corrosion activities can be obtained directly from a graph, such as the one shown in FIG. 2, or by calculations from individual current measurements. In the calculation method, the corrosion current for the previous example is determined as follows. The current through the electrodes at time zero in FIG. 2 is 225 microamperes in the positive direction. Upon reversal of the potential polarity, the electrode current changed to about 510 microamperes in the positive direction. The instantaneous long cell corrosion current, according to Equation 8 is:

$$I_{\text{Long Cell}} = \frac{510 + 225}{1 + 1}$$

or $$I_{\text{Long Cell}} = 360 \text{ microamperes,}$$

the distance between line 50 and center-zero. The local cell corrosion current, according to Equation 9 is:

$$I_{\text{Local Cell}} = \frac{510 - 225}{1 + 1}$$

or $$I_{\text{Local Cell}} = 143.5 \text{ microamperes,}$$

which is the distance U or U' in FIG. 2.

The addition of sodium nitrate to the corrosive environment in the previous example reduced both types of corrosion. The long cell corrosion current (line 50) was decreased from about 175 microamperes at point A to a minimum of about 20 microamperes. The local cell corrosion current (U or U') was decreased from about 200 microamperes at point A to a minimum of about 10 microamperes.

FIG. 2 clearly shows that the addition of sodium nitrite to the corrosive environment, inhibited both long cell and local cell corrosion. This type of data is particularly important in determining the inhibiting efficiency of corrosion inhibitors, since data on only one kind of corrosion activity will not adequately predict the efficiency of the corrosion inhibitor. For example, one kind of inhibitor may only inhibit long cell action while not restricting the local cell action and vice versa.

Electrodes that can be employed in the practice of this invention can be of any electrically conductive material, e.g., metals or metal alloys. They can be of any convenient size and shape, and it is best that they be rigidly mounted in the corrosive environment in substantially parallel relationship. The electrodes can be mounted on pipe plugs or other fittings to permit their installation in pressure vessels, pipes, and the like, or they can be constructed in such a way as to permit them to be driven into the soil. However, in each electrode assembly, the exposed surface area of the electrodes must be known, since this area enters into the calculation of the corrosion rate.

The physical and chemical characteristics of the electrodes are also important. If the electrodes are highly polished, the corrosion rate obtained will apply to polished metal, and similarly, if the electrodes are rusted, the corrosion rate obtained will apply to rusted metal. Contrary to the corrosion measuring devices and methods of the prior art, i.e., the electrical resistance method, two dissimilar electrodes can be employed in this invention. The electrodes can be subjected to different chemical and/or physical environmental conditions, so long as they are exposed to a corrosive conductive environment. The electrodes can be of different metals, have different surface conditions (i.e., one pre-corroded and one uncorroded), be maintained at different temperatures, be under different conditions of stress, etc. The vessel or pipe containing the corrosive environment can be used as one of the electrodes if it is fabricated from an electrically conductive material. Various other electrode assemblies are fully disclosed in U.S. Pat. No. 3,398,065.

The corrosion data obtained by using two dissimilar electrodes in the method of this invention will usually be an average of the corrosion rates of each of the electrodes. For example, if an uncorroded electrode and a precorroded electrode are used together, the instantaneous local and long cell corrosion rates obtained will be an average of the individual corrosion rates of the two electrodes. Similarly, an average corrosion rate is obtained, as for example, if two steel electrodes are used, and one of which is under stress. These average corrosion measurements, which are obtained using two dissimilar electrodes are, however, only relative measurements. Nevertheless, these measurements are useful for a number of purposes, such as, determining the effectiveness of corrosion inhibitors.

Several alternative modes may be employed to compute long cell corrosion currents and long cell corrosion rates from the observed current flows. In the simplist mode, long cell corrosion current and corrosion rate may be hand calculated using Equations 8 and 6 in the manner described above. More preferably, the values of observed current flows can be recorded on a continuous zero-center strip chart. The respective values of long and local cell corrosion current can then be read from the chart. Also, the chart can be calibrated to read corrosion rate directly in the manner described. Alternatively, the potential across resistor 34 can be used as an input signal to a conventional analog or digital computer that is programmed to perform the desired computation. The output from the computer corresponding to either or both of the long cell corrosion current or the long cell corrosion rate can be in either analog or digital form, and can be displayed on a meter, strip chart recorder, or in any of the conventional digital display forms.

It is apparent that with my method, the instantaneous corrosion rates of metallic equipment exposed to corrosive conditions can be continuously monitored. Subtle changes in the corrosive nature of the corrodent can be detected immediately. The time required for depositing a completely inhibiting film on any metallic surface and the corrosion resistance of such film can be determined. Furthermore, pitting tendencies of metals exposed to a corrosive environment can be predicted. Also the affects of velocity, temperature, or scale deposits on corrosion rates can be obtained. Hence this invention represents a substantial advancement over the prior art methods of obtaining corrosion data.

The invention having thus been described, I claim:

1. A method for measuring long cell corrosion current, which comprises:
   disposing two metallic electrodes in spaced relationship in a corrosive electrolytic environment;
   applying across said electrodes a first D.C. potential having a value of less than 0.03 volt;
   measuring the magnitude and direction of a first observed current flow between said electrodes for said first applied potential;
   applying across said electrodes a second D.C. potential having the same value less than 0.03 volt and being of opposite polarity to said first potential;
   measuring the magnitude and direction of a second observed flow between said electrodes for said second potential; and
   vectorially averaging the measured values of said first observed current and said second observed current to obtain a current value corresponding to the long cell corrosion current.

2. The method defined in claim 1 including the step of measuring said first and said second D.C. potentials.

3. The method defined in claim 1 wherein said first and second D.C. potential are each applied across said electrodes for a time period of between about 0.5 minute and about 30 minutes.

4. The method defined in claim 1 wherein said first and said second D.C. potentials are applied across said electrodes at a common voltage between about 0.01 and 0.025 volt.

5. The method defined in claim 1 wherein said metallic electrodes have similar physical and chemical properties.

6. A method for measuring long cell corrosion current, which comprises:
   disposing two metallic electrodes in spaced relationship in a corrosive electrolytic environment;
   applying across said electrodes, in sequence, a series of D.C. potentials having a common value of less than 0.03 volt, each successive potential applied being of opposite polarity;
   measuring the magnitude and direction of an observed current flow between said electrodes for said successively applied potentials; and
   vectorially averaging the measured values of said observed current flows to obtain a current value corresponding to the long cell corrosion current.

7. The method defined in claim 6 including the step of recording the measured values of said observed current flows on a strip chart, and wherein the long cell corrosion current is determined by vectorially averaging the recorded measured values of said observed current flows obtained by the application of successively applied potentials of opposite polarity.

8. The method defined in claim 6 including the additional step of determining a long cell corrosion rate from said long cell corrosion current.

9. The method described in claim 8 wherein said long cell corrosion rate is calculated from said long cell corrosion current in accordance with the following formula:

$$C_{\text{Long Cell}} = KI_{\text{Long Cell}}$$

wherein
   $C_{\text{Long Cell}}$ is the long cell corrosion rate;
   $K$ is a constant determined for each system; and
   $I_{\text{Long Cell}}$ is the long cell corrosion current.

10. The method defined in claim 7 wherein the strip chart is driven at a constant speed and wherein the long cell corrosion current is determined as a function of time by vectorially averaging each recorded value of observed current flow and the immediately preceding recorded value of observed current flow obtained by the application of a potential of opposite polarity.

11. The method defined in claim 6 wherein each successive D.C. potential is applied across said electrodes for a time period of between about 1 minute and about 5 minutes.

12. The method defined in claim 6 wherein said D.C. potentials are applied across said electrodes at a constant voltage between about 0.01 and 0.025 volt.

13. A method for measuring the long cell corrosion current of a corrodible metal, which comprises:
   disposing two electrodes of said metal in spaced relationship in a corrosive environment;
   applying between said electrodes a first D.C. potential having a known value between about 0.01 and 0.025 volt;
   measuring the magnitude and direction of a first observed current flow between said electrodes for said first applied potential;
   reversing the polarity of said D.C. potential applied across said electrodes;
   measuring the magnitude and direction of a second observed current flow between said electrodes for said applied potential of reversed polarity; and
   vectorially averaging said first and said second observed current flows to obtain a current value corresponding to the long cell corrosion current.

14. A method for measuring the long cell corrosion rate of a metal, which comprises:
   disposing two electrodes of said metal in spaced relationship in a corrosive environment;
   applying between said electrodes a first D.C. potential having a known value between about 0.01 and 0.025 volt;
   measuring the magnitude and direction of a first observed current flow between said electrodes for said first applied potential;
   reversing the polarity of said D.C. potential applied across said electrodes;
   measuring the magnitude and direction of a second observed current flow between said electrodes for said applied potential of reversed polarity;
   vectorially averaging said first and said second observed current flows to obtain a current value corresponding to the long cell corrosion current; and
   computing the long cell corrosion rate in accordance with the following formula:

$$C_{\text{Long Cell}} = KI_{\text{Long Cell}}$$

wherein
   $C_{\text{Long Cell}}$ is the long cell corrosion rate;
   $K$ is a constant determined for each system; and
   $I_{\text{Long Cell}}$ is the long cell corrosion current measured by the vectorial average of said first and said second observed current flows.

References Cited
UNITED STATES PATENTS 3,069,332    12/1962    Seyl ---------------- 204—1 T
3,065,151    11/1962    Schaschl et al. ------ 204—1 T GERALD L. KAPLAN, Primary Examiner U.S. Cl. X.R.

204—195 C

UNITED STATES PATENT OFFICE
CERTIFICATE OF CORRECTION

Patent No. 3,840,439            Dated October 8, 1974

Inventor(s) Glenn A. Marsh

It is certified that error appears in the above-identified patent and that said Letters Patent are hereby corrected as shown below:

Claim 1, line 28, after "observed" the word --- current --- has been inserted.

Signed and sealed this 24th day of December 1974.

(SEAL)
Attest:

McCOY M. GIBSON JR.
Attesting Officer

C. MARSHALL DANN
Commissioner of Patents